US008805403B2

(12) United States Patent
Curticapean et al.

(10) Patent No.: US 8,805,403 B2
(45) Date of Patent: Aug. 12, 2014

(54) AUTOMATIC DATA ACCURACY MAINTENANCE IN A WI-FI ACCESS POINT LOCATION DATABASE

(75) Inventors: Florean Curticapean, Tampere (FI); Abdelmonaem Lakhzouri, Tampere (FI); Joonas Viskari, Tampere (FI)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 13/440,744

(22) Filed: Apr. 5, 2012

(65) Prior Publication Data

US 2013/0267242 A1    Oct. 10, 2013

(51) Int. Cl.
*H04W 24/00*    (2009.01)
(52) U.S. Cl.
USPC ............ 455/456.1; 455/456.2; 455/456.3; 455/404.2; 455/418; 370/252
(58) Field of Classification Search
USPC ........... 455/456.1, 456.2, 404.2, 456.3, 418; 370/252, 328
See application file for complete search history.

(56) References Cited

U.S. PATENT DOCUMENTS

| | | | | |
|---|---|---|---|---|
| 6,014,181 A * | 1/2000 | Sun | | 348/699 |
| 7,257,413 B2 * | 8/2007 | Sheynblat | | 455/456.1 |
| 7,738,884 B2 * | 6/2010 | Cheung et al. | | 455/456.3 |
| 2003/0125046 A1 * | 7/2003 | Riley et al. | | 455/456 |
| 2003/0235164 A1 * | 12/2003 | Rogers et al. | | 370/331 |
| 2005/0020309 A1 * | 1/2005 | Moeglein et al. | | 455/561 |
| 2005/0124355 A1 * | 6/2005 | Cromer et al. | | 455/456.5 |
| 2006/0009235 A1 * | 1/2006 | Sheynblat et al. | | 455/456.1 |
| 2006/0240840 A1 | 10/2006 | Morgan et al. | | |
| 2007/0002813 A1 * | 1/2007 | Tenny et al. | | 370/338 |
| 2007/0121560 A1 * | 5/2007 | Edge | | 370/338 |
| 2007/0178913 A1 * | 8/2007 | Niemenmaa et al. | | 455/456.4 |
| 2007/0270168 A1 * | 11/2007 | Sheynblat | | 455/456.6 |
| 2008/0008121 A1 * | 1/2008 | Alizadeh-Shabdiz | | 370/328 |
| 2010/0093368 A1 | 4/2010 | Meyer et al. | | |
| 2010/0135178 A1 * | 6/2010 | Aggarwal et al. | | 370/252 |
| 2010/0172259 A1 * | 7/2010 | Aggarwal et al. | | 370/252 |
| 2010/0278079 A1 * | 11/2010 | Meyer et al. | | 370/255 |
| 2011/0182238 A1 * | 7/2011 | Marshall et al. | | 370/328 |
| 2011/0183626 A1 * | 7/2011 | Das et al. | | 455/67.11 |
| 2011/0235532 A1 * | 9/2011 | Alizadeh-Shabdiz et al. | | 370/252 |
| 2011/0235623 A1 * | 9/2011 | Alizadeh-Shabdiz et al. | | 370/338 |
| 2011/0286437 A1 * | 11/2011 | Austin et al. | | 370/338 |
| 2012/0094597 A1 * | 4/2012 | Tysowski | | 455/41.1 |
| 2012/0094598 A1 * | 4/2012 | Tysowski | | 455/41.1 |
| 2012/0264447 A1 * | 10/2012 | Rieger, III | | 455/456.1 |
| 2013/0059542 A1 * | 3/2013 | Shimizu | | 455/67.11 |
| 2013/0079031 A1 * | 3/2013 | Kuhn et al. | | 455/456.1 |

OTHER PUBLICATIONS

International Search Report and Written Opinion—PCT/US2013/033385—ISA/EPO—May 22, 2013.

* cited by examiner

*Primary Examiner* — Kamran Afshar
*Assistant Examiner* — Mong-Thuy Tran
(74) *Attorney, Agent, or Firm* — Mahamedi Paradice LLP

(57) ABSTRACT

A method and apparatus for maintaining data accuracy in an access point (AP) location database including a plurality of stored location data are disclosed that can automatically update the AP location database meanwhile maintaining the data accuracy in the database. In some embodiments, the AP location database server receives a first set of location measurements for a first AP from a first mobile device, determines a trustworthiness of the first set of location measurements based on a first comparison between the first set of location measurements and the location data for the first AP stored in the AP location database, and selectively updates the stored location data for the first AP in the AP location database with the received first set of location measurements in response to the determined trustworthiness.

24 Claims, 9 Drawing Sheets

AUTOMATIC DATA ACCURACY MAINTENANCE IN A WI-FI ACCESS POINT LOCATION DATABASE

TECHNICAL FIELD

The present embodiments relate generally to wireless communication, and specifically to Wi-Fi access point positioning systems.

BACKGROUND OF RELATED ART

Modern navigation systems frequently use a global navigation satellite system (GNSS) for position determination. However, the recent proliferation of Wi-Fi access points in wireless local area networks (WLANs) has made it possible for navigation systems to use these access points for position determination, especially in areas where there is a large concentration of active Wi-Fi access points (e.g., urban cores, shopping centers, office buildings, and so on). Indeed, WLAN positioning systems can be advantageous over GNSS in certain environments because of GNSS signal coverage limitations. For example, while GNSS signals may not be readily detectable inside structures such as shopping malls and office buildings (e.g., due to signal attenuation and/or multipath effects), wireless signals generated by Wi-Fi access points located within such structures are typically detectable by each other and by Wi-Fi enabled mobile devices within range of such access points.

For WLAN positioning systems, the locations of the Wi-Fi access points are used as reference points from which well-known trilateration techniques can determine the location of a mobile device (e.g., a Wi-Fi-enabled cell phone, laptop, or tablet computer). More specifically, the mobile device can use the received signal strength indicators (RSSI) associated with a number of visible access points as indications of the distances between the mobile device and each of the detected access points, where a stronger RSSI means that the mobile device is closer to the access point and a weaker RSSI means that the mobile device is further from the access point. The mobile device can also use the round trip time (RTT) of signals transmitted to and from the access points to estimate the distances between the mobile device and the access points. Once these distances are estimated, the location of the mobile device relative to the access points can be determined using trilateration techniques.

Whether using RSSI or RTT techniques to determine the distances between the mobile device and the visible Wi-Fi access points, the precise geographic location (e.g., latitude and longitude) of at least three such access points needs to be known to establish the absolute location of the mobile device. A number of online location databases can be used to determine the locations of large numbers of actively deployed Wi-Fi access points according to their unique basic service set identifier (BSSID) values. For example, companies including Google, Skyhook, Devicescape, and WiGLE have built access point location severs (APLS) of BSSID values and the geographic locations of their corresponding access points. Typically, the location of a particular access point is first determined either manually (e.g., using electronic mapping) or using the access point's embedded GNSS capabilities, and then the access point's location is uploaded (along with the access point's BSSID value) to the access point location server. Thereafter, a mobile device can determine the precise location of a selected visible access point by obtaining the BSSID from the access point, providing the BSSID to the location server, and then receiving the access point's location coordinates from the location server.

Once the location coordinates of 3 visible access points are known to the mobile device, positioning software operating on the mobile device can use the estimated distances between itself and each of the 3 access points (e.g., calculated using ranging operations involving RTT and/or RSSI techniques) to calculate the location coordinates of itself using trilateration techniques. It is noted that to continually provide accurate AP location information to mobile devices, the access point location servers are frequently updated because of the relatively transient nature of Wi-Fi access points (e.g., access points are often moved, serviced, and/or decommissioned).

Thus, because the location information of access points in an access point location server is used in determining the location of wireless client devices, the accuracy of such location data is crucial for the WLAN positioning system to provide accurate information to the client devices. Typically, entities maintaining these access point location servers update the AP location information stored therein using manual techniques (e.g., traveling to a particular AP and then surveying its location to ensure that its location information is currently correct), which may consume a significant amount time and man-power.

Accordingly, there is a need to automatically update access point location servers in a manner that maintains the accuracy of the AP location data stored therein.

BRIEF DESCRIPTION OF THE DRAWINGS

The present embodiments are illustrated by way of example and are not intended to be limited by the figures of the accompanying drawings, where.

Like reference numerals refer to corresponding parts throughout the drawing figures.

DETAILED DESCRIPTION

In accordance with the present embodiments, a wireless local area network (WLAN) positioning system and method for maintaining data accuracy in an access point location server (APLS) are disclosed that can automatically update the APLS while maintaining the accuracy of data stored therein. The WLAN positioning system includes a plurality of Wi-Fi access points, and the APLS can be remotely accessed by a mobile device (e.g., a cell phone or tablet computer). The APLS, which stores identification and location information of the access points, can be requested to provide such information to the mobile device so that the mobile device can use the access points as reference points in calculating the mobile device's location using trilateration techniques. For some embodiments, the APLS receives a set of location measurements for an AP from a mobile device, determines a trustworthiness of the set of location measurements based on a comparison between the set of location measurements and corresponding AP location data stored in the APLS, and selectively updates the stored AP location data with the received set of location measurements in response to the determined trustworthiness.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. Further, as used herein, the term WLAN can include communications governed by the IEEE 802.11 standards, Bluetooth, Hiper-LAN (a set of wireless standards, comparable to the IEEE 802.11 standards, used primarily in Europe), and other technologies having a relatively short radio propagation range. The present embodiments are not to be construed as limited to specific examples described herein but rather to include within their scopes all embodiments defined by the appended claims.

Figure 1:
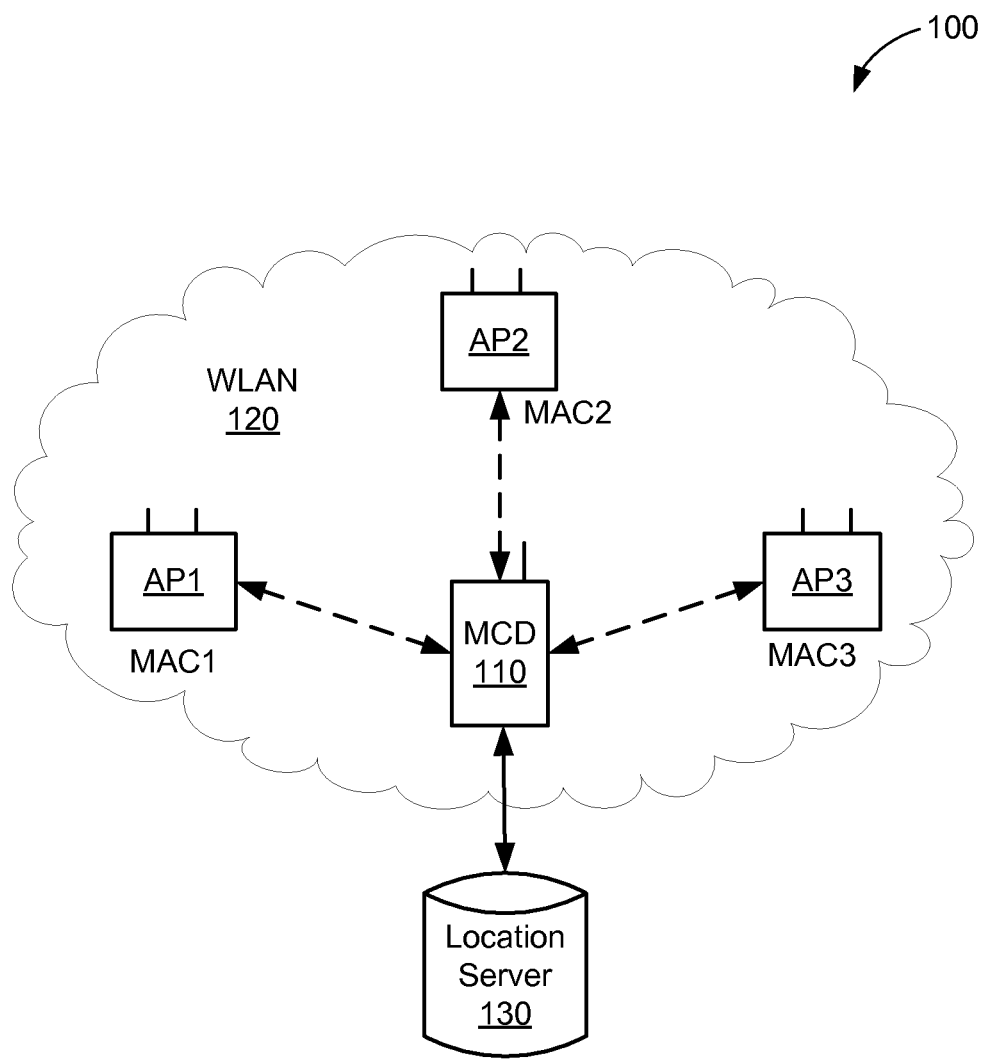
FIG. 1 is a block diagram of a WLAN positioning system within which the present embodiments may be implemented.

FIG. 1 is a block diagram of a wireless positioning system 100 in accordance with the present embodiments. System 100 is shown to include a mobile communication device (mobile device) 110, a wireless local area network (WLAN) 120, and an access point location server (APLS) 130. The WLAN 120 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 120 can be formed by any number of access points. Each of access points AP1-AP3 is assigned a unique MAC address (i.e., MAC1-MAC3, respectively) that is programmed therein by, for example, the manufacturer of the access point. Each MAC address, which may be commonly referred to as the "burned-in address," the organizationally unique identifier (OUI), or the BSSID, in one embodiment includes six bytes of data. The first 3 bytes of the MAC address may identify which organization manufactured the access point device (e.g., whether the AP is made by Cisco Systems, Inc.), and may be assigned to such organizations by the Institute of Electrical and Electronic Engineers (IEEE). The second 3 bytes of the MAC address, which may be referred to as the network interface controller (NIC) specific bytes, may be used to uniquely identify the individual access point device.

The APLS 130, which stores the MAC addresses and location coordinates of a plurality of deployed access points (e.g., not just access points AP1-AP3 of FIG. 1), may be an online database accessible by mobile device 110 that may be provided by companies such as Google, Skyhook, Devicescape, and/or WiGLE. The APLS 130 may also store other information associated with the access points including, for example, the accuracy (e.g., quality) of the location coordinates of each access point, the last location update for each access point, the last time each access point was visible, the protocol version of each access point, the location status of each access point, the trustworthiness of location measurements provided by a particular mobile device, and so on. For some embodiments, selected portions of the APLS 130 can be retrieved and stored within mobile device 110, as described in more detail below.

Mobile device 110, which may also be referred to herein as the client device, can be any suitable W-Fi enabled wireless device including, for example, a cell phone, a PDA, a tablet computer, a laptop, or the like. For the embodiments described herein, mobile device 110 includes radio frequency (RF) ranging circuitry (e.g., formed using well-known software modules, hardware components, and/or a suitable combination thereof) that can be used to estimate the distance between itself and one or more visible access points (AP) using suitable ranging techniques. For example, mobile device 110 can use received signal strength indicator (RSSI) and/or round trip time (RTT) techniques to estimate the distance between itself and the access points AP1-AP3, for example, by correlating each RSSI or RTT value with a distance. In addition, mobile device 110 includes a local memory that stores a cache of Wi-Fi access point location data, and includes a processor that can execute WLAN positioning software and APLS data retrieval software. The positioning software can calculate the position of mobile device 110 using the known locations of visible access points as reference points. The data retrieval software can selectively request location data for Wi-Fi access points from the APLS 130 using public and/or private fetching operations.

Figure 2:
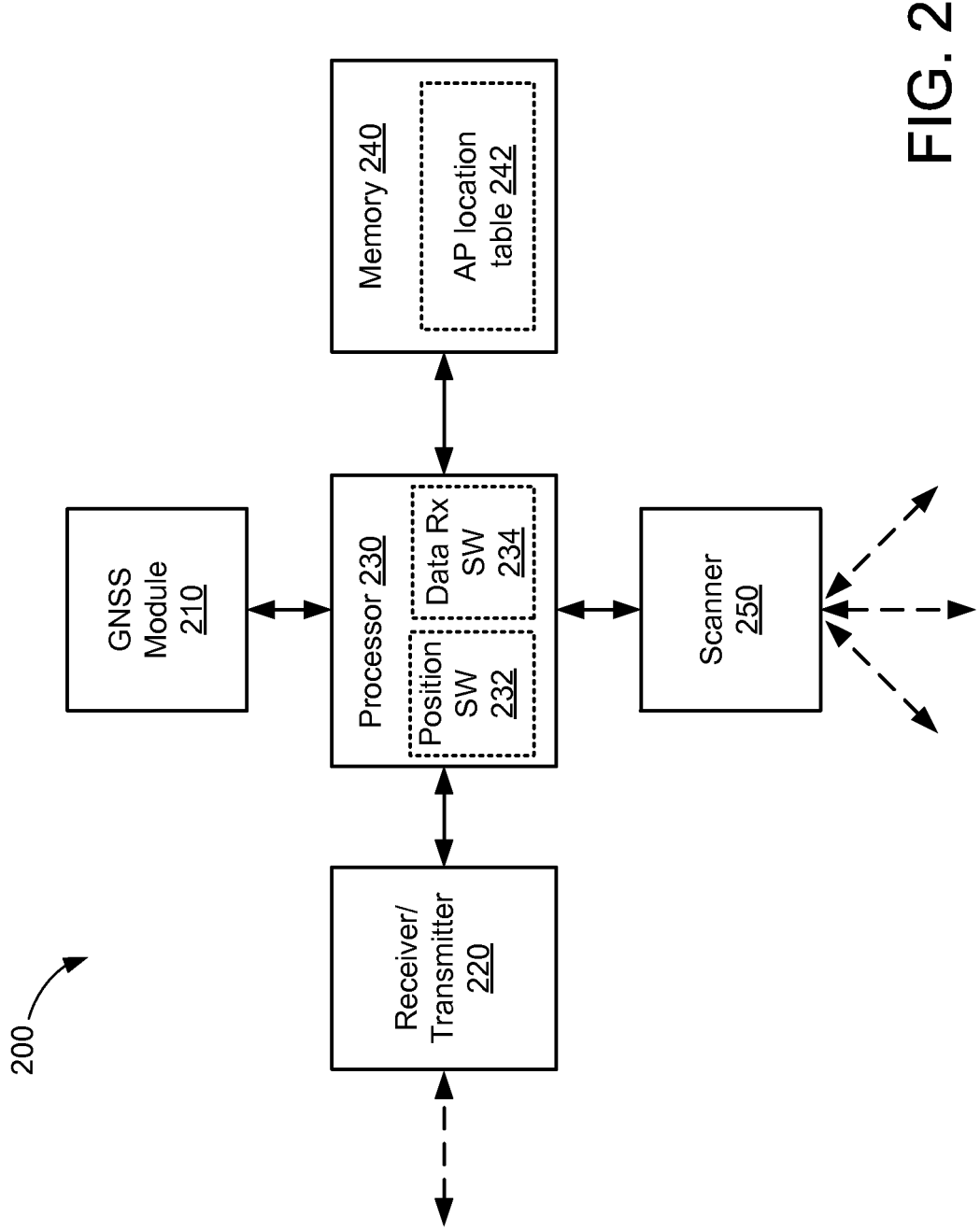
FIG. 2 is a functional block diagram of the mobile communication device of FIG. 1 in accordance with some embodiments.

More specifically, FIG. 2 shows a mobile device 200 that is one embodiment of mobile device 110 of FIG. 1. Mobile device 200 is shown to include a global navigation satellite system (GNSS) module 210, a receiver/transmitter circuit 220, a processor 230, a memory 240, and a scanner 250. The receiver/transmitter circuit 220 can be used to transmit signals to and receive signals from access points AP1-AP3 and/or the APLS 130 (see also FIG. 1). Scanner 250, which is well-known, can be used to scan the surrounding environment to detect and identify nearby access points (e.g., access points within range of mobile device 200). For some embodiments, the scanner 250 can search for nearby access points by periodically transmitting MAC address request frames. An access point within range of mobile device 200 receives one or more of the requests and responds by transmitting its MAC address to the mobile device 200. If mobile device 200 has line-of-sight with a suitable number (e.g., 3 or more) of navigation satellites, the GNSS module 210 can determine the current location of mobile device 200 using triangulation techniques, and can then provide the location information to processor 230 for storage in memory 240.

Memory 240, which can be any suitable memory element or device (e.g., EPROM, EEPROM, Flash memory, and so on), includes an access point location table 242 that can be used as a local cache to store the MAC addresses of a plurality of access points, the location coordinates of such access points, and other suitable location or configuration information of the access points (e.g., a certainty value indicating the certainty of the AP's stored location coordinates).

Processor 230, which is coupled to receiver/transmitter 220, GNSS module 210, memory 240, and scanner 250, can be any suitable processor capable of executing scripts or instructions of one or more software programs stored in mobile device 200 (e.g., within memory 240). More specifically, processor 230 is shown in FIG. 2 as including a WLAN positioning software module 232 and a data retrieval software module 234. The positioning software module 232 can be executed by processor 230 to determine the location of mobile device 200 using nearby access points as reference points. For example, to determine the position of mobile device 200, the precise locations of three selected access points (e.g., access points AP1-AP3) are first determined, either by accessing their location coordinates from memory 240 or by retrieving their location coordinates from the ALPS 130, as explained in more detail below. Next, mobile device 200 estimates the distance between itself and each of the selected access points using suitable RF ranging techniques (e.g., RSSI and/or RTT techniques). Then, positioning software module 232 uses the location coordinates of the selected access points and the estimated distances between them and mobile device 200 to calculate the position of mobile device 200 using trilateration techniques.

Data retrieval software module 234 can be executed by processor 230 to retrieve location information of visible and/or non-visible access points from the APLS 130. For example, once the MAC addresses of a number of selected APs are determined, the data retrieval software module 234 can send the MAC addresses of the selected APs to the APLS 130. For some embodiments, mobile device 110 may also send distance measurements between itself and the selected AP(s) and/or its own location (e.g., obtained from GNSS module 210) to the APLS 130. In response to the MAC addresses sent from mobile device 110, the APLS 130 retrieves the location coordinates of the selected AP(s) stored therein, and then transmits the location coordinates of the selected AP(s) to mobile device 110. Thereafter, mobile device 110 can use the AP location coordinates and the corresponding distance measurements to determine its own location.

For purposes of discussion herein, the term "location measurement" refers to the measurement data sent from mobile device 110 to the APLS 130, and may include distance measurements and estimated locations provided by mobile device 110. Similarly, the term "calculated location" refers to the location that is trilaterated from a set of location measurements, and the term "location data" refers to the AP location coordinates (e.g., latitude, longitude, and/or altitude) and related location information (e.g., quality values, location status values, trustworthy values, and so on) that are stored in the APLS 130.

As mentioned above, the locations of various deployed APs may change (e.g., because they are moved or taken off-line). If the corresponding AP location data stored in the APLS 130 is not updated accordingly, mobile devices that retrieve the outdated location data from the APLS 130 may generate incorrect location results. Thus, because mobile device 110's reported location may be one of the latest field observations of the an AP's location, the APLS 130 can be selectively updated using location measurements provided by the mobile device 110 according to the present embodiments, thereby maintaining the AP location data stored in the APLS 130 up to date. However, because mobile device 110's reported location may not always be reliable, it is desirable to determine the accuracy of the mobile device's reported location when using such information to update AP location data stored in the APLS 130.

More specifically, for some embodiments, after receiving a set of location measurements for a selected AP from mobile device 110, the APLS 130 determines a trustworthiness value of the set of location measurements based on a comparison between the set of location measurements provided by mobile device 110 and the corresponding AP location data already stored in the APLS 130. Then, in response to the determined trustworthiness, the APLS 130 selectively updates the stored location data for the selected AP using the set of location measurements provided by the mobile device 110. In this manner, the APLS 130 can automatically update AP location data stored therein while maintaining the accuracy of such location data. In addition, by automatically updating the AP location data stored in the APLS 130, laborious manual updates to the APLS 130 may be advantageously avoided.

In accordance with the present embodiments, if there is a discrepancy between the set of location measurements provided by mobile device 110 and the AP location data already stored in the APLS 130, it is first determined whether the discrepancy results from a genuine AP relocation event, an erroneous measurement (e.g., a spike) by the mobile device, a malicious spoofing attempt, or some other event that may render the set of location measurements unreliable. For some embodiments, the discrepancy determination may be achieved using an "area recognition" operation in which the locations of other APs calculated using location measurements provided by mobile device 110 are compared with the previously known location coordinates of such other APs to determine whether the AP locations calculated by the mobile device 110 are reliable and/or trustworthy.

More specifically, if a selected AP has not moved, then the location of the selected AP as calculated by mobile device 110 should be the same as or very close to (e.g., within 50 feet) the previously known AP location (e.g., as stored in the APLS 130). If the newly calculated AP location is more than a predetermined threshold distance $D_{TH}$ (e.g., more than 50 feet) from the previously known location of the selected AP, then the APLS 130 may perform the area recognition operation by first identifying whether the mobile device calculated the locations of other APs at the same or similar time as it calculated the location of the selected AP, and then comparing the calculated locations of these other APs with their previously known locations (e.g., as stored in the APLS 130) to determine a trustworthiness value associated with the location measurements provided by the mobile device 110.

For some embodiments, if more than a predetermined number or percentage of the calculated locations for the other APs are consistent with the previously known locations of the other APs (e.g., within the predetermined threshold distance $D_{TH}$), then the newly calculated location for the selected AP may be treated as trustworthy, and the APLS 130 may update the stored AP location data using the set of location measurements provided by the mobile device 110. Conversely, if less than the predetermined number or percentage of the calculated locations for the other APs are consistent with the previously known locations of the other APs, then the newly calculated location for the selected AP may be deemed to be untrustworthy. In response thereto, the newly calculated location for the selected AP is rejected, and the APLS 130 does not update the stored location information of the selected AP.

More specifically, for some embodiments, the APLS 130 may assign a trustworthiness value to a set of AP locations calculated by the mobile device 110. Because the relocation of a large number of APs during a short time period is unlikely, the APLS 130 may determine a trustworthiness value (TW) for each set of location measurements it receives from mobile device 110 based on comparisons between AP location information calculated by the mobile device 110 and AP location data currently stored in the APLS 130. For some embodiments, the trustworthiness value can be derived according to how many of the calculated locations for the other APs are consistent with the corresponding AP location data already stored in the APLS 130, where a higher trustworthiness value indicates that a larger number or percentage of the calculated locations for the other APs are consistent with the corresponding AP location data already stored in the APLS 130, and a lower trustworthiness value indicates that a smaller number or percentage of the calculated locations for the other APs are consistent with the corresponding AP location data already stored in the APLS 130.

The trustworthiness value can be any suitable scale, state machine, and/or number system that indicates different levels at which a location measurement can be deemed to be trustworthy. For some embodiments, the trustworthiness value may be compared with a trustworthiness threshold, where the AP location calculated by mobile device 110 is deemed to be trustworthy if the trustworthiness value is greater than or equal to the trustworthiness threshold, and the AP location calculated by mobile device 110 is deemed to be untrustworthy if the trustworthiness value is less than the trustworthiness threshold. For example, in an exemplary embodiment, a trustworthiness scale of 1 to 10 may be used, where a trustworthy value of 10 is the most trustworthy and a trustworthy value of 1 is the least trustworthy. For this exemplary embodiment, the trustworthiness threshold may be set to 7, and thereafter only AP locations calculated by a mobile device 110 having a trustworthiness value greater than or equal to 7 are accepted and used to update the AP location information stored in the APLS 130.

For other embodiments, more than one trustworthiness threshold may be employed, and the possible number of trustworthiness states may be more than two. For an exemplary embodiment, a tri-state trustworthiness system may be employed that includes the states "trustworthy," "suspicious," and "untrustworthy." For this exemplary embodiment having a trustworthiness scale of 1 to 10, a trustworthy value ≥7 may indicate that the location measurements are deemed to be trustworthy, a trustworthy value between 4 and 7 may indicate that the location measurements are deemed to be suspicious, and a trustworthy value ≥4 may indicate that the location measurements are deemed to be untrustworthy.

For one embodiment, if the number of AP location measurements provided by mobile device 110 and determined to be untrustworthy exceeds a predetermined count value N, then all location measurements provided by mobile device 110 are rejected. For another embodiment, if the number of AP location measurements calculated by mobile device 110 and determined to be untrustworthy exceeds the predetermined count value N, then all location measurements provided by mobile device 110 during a corresponding time period are rejected.

Figure 3:
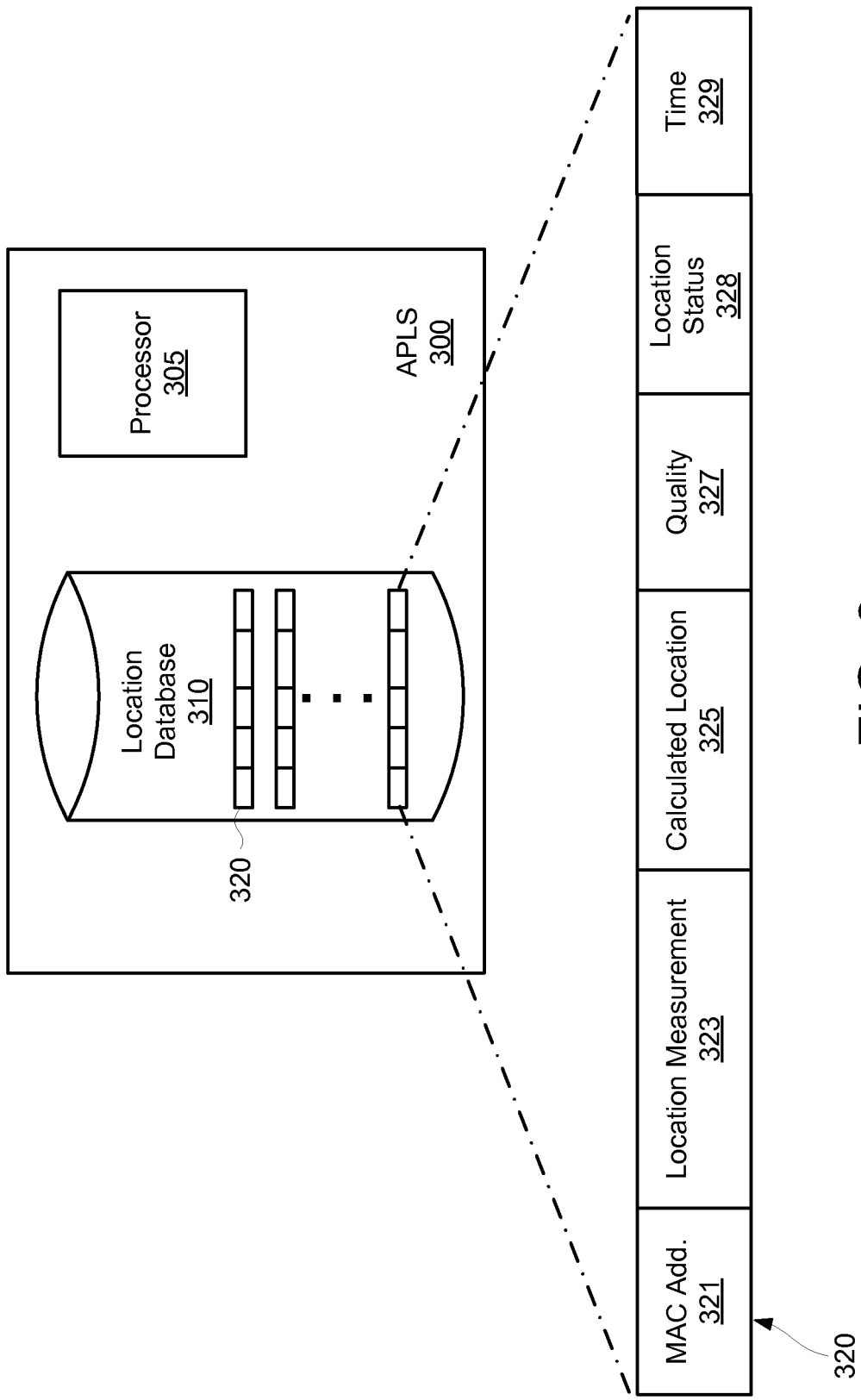
FIG. 3 is a functional block diagram of one embodiment of the access point location server of FIG. 1.

FIG. 3 is a functional block diagram of an APLS 300 that is one embodiment of the APLS 130 of FIG. 1. The APLS 300 is shown in FIG. 3 to include a processor 305 and an AP location database 310. Processor 305 can be any suitable processor capable of executing scripts or instructions of one or more software programs, and can be used to retrieve and/or update location information stored in location database 310, for example, in response to MAC addresses provided by mobile device 110.

The location database 310 includes a plurality of location entries 320, each of which stores location information for a corresponding AP. More specifically, each location entry 320 of FIG. 3 includes a MAC address field 321, a location measurement field 323, a calculated location field 325, a quality field 327, a location status field 328, and a time field 329. For other embodiments, each location entry 320 can include other fields to store additional information about the corresponding AP.

The MAC address field 321 stores the MAC address of a corresponding access point (AP). The location measurement field 323 stores a set of measured distances for the corresponding AP, which can be derived from the RTT and/or RSSI values measured by mobile device 110, or can be from other sources (e.g., a field survey). The calculated location field 325 stores the location data (e.g., longitude, latitude, and/or altitude) corresponding to the set of location measurements stored in field 323. The quality field 327 stores quality values that indicate the quality of the set of location measurements and the calculated location for the corresponding AP. The quality values may have any number of different values. For some embodiments, the quality values have one of five possible values: "primary," "auxiliary_1," "auxiliary_2," "auxiliary_3," and "untrusted," where the primary value indicates the highest quality level and the untrusted value indicates the lowest quality level. The location status field 328 stores a location status value for the corresponding AP. For some embodiments, the location status value may have one of three possible states: "trusted," "ambiguous," and "unknown." The time field 329 stores the time at which the set of location measurements 323 associated with the entry 320 are made. For one embodiment, the APLS 300 may ensure the accuracy of AP location information provided to WLAN 120 by providing location information only for APs having status values of "trusted."

For some embodiments, location entries 320 may employ a linked list data structure (or any other suitable data structure) that allows the corresponding AP to be associated with a plurality of calculated locations, each having its own quality value. For other embodiments, each AP location entry 320 may be limited to one calculated location to minimize the storage area of location database 310.

Figure 4A:
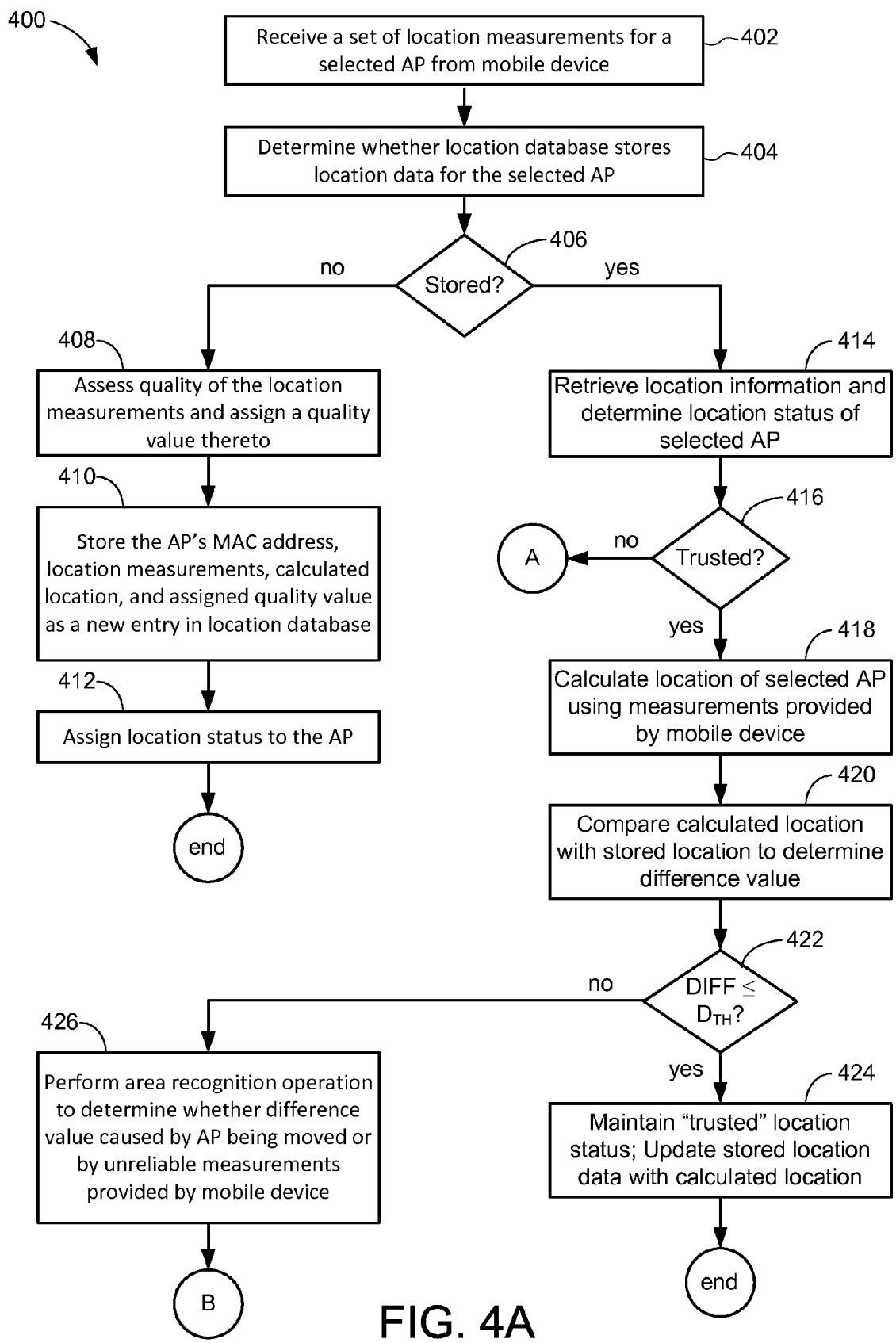
FIGS. 4A-4C show an illustrative flow chart depicting an exemplary operation for updating AP location information stored in the APLS of FIG. 3.

Exemplary operations for automatically updating location information stored in the APLS 300 are described below with respect to the illustrative flow chart shown in FIGS. 4A-4C, and with reference to FIGS. 1-3. Referring now to FIG. 4A, the APLS 300 first receives a set of location measurements for a selected AP from mobile device 110 (402), and then the APLS 300 searches its location database 310 to determine whether location data for the selected AP is currently stored therein (404). As discussed above, the set of location measurements provided by mobile device 110 may include estimated distances between itself and the selected AP (e.g., calculated using ranging operations employing RSSI and/or RTT techniques), a calculated location for the selected AP, and/or other location information.

If the location data for the selected AP is not currently stored in the location database 310, as tested at 406, then the APLS 300 assesses the quality of the AP location measurements provided by mobile device 110 and assigns a quality value thereto (408). Then, the APLS 300 stores the AP's MAC address, the set of location measurements, the calculated location of the selected AP, and the assigned quality value as a new entry 320 in the location database 310 (410).

Quality assessment may employ any suitable statistical technique to determine how consistent the set of location measurements provided by mobile device 110 are. For some embodiments, standard deviation techniques may be used to assess the quality of the location measurements provided by mobile device 110. For example, a smaller deviation may indicate that the set of location measurements are of a higher quality, and a larger deviation may indicate that the set of location measurements are of a lower quality. For other embodiments, a center of mass may be mathematically determined for the set of location measurements, and a vector distance may be calculated between elements in the set of location measurements and the center of mass. For some embodiments, the APLS 300 selectively stores the set of location measurements as a new entry in location database 310 in response to the assigned quality value.

Thereafter, the APLS 300 assigns a location status value to the selected AP (412). For some embodiments, the location status value may be derived from the previously calculated quality value. For example, in an exemplary embodiment, if the quality value is "primary", then the APLS 300 sets the selected AP's location status to "trusted". If the quality value is lower than primary but higher than untrusted, then the APLS 300 sets the selected AP's location status to "ambiguous". Conversely, if the quality value is "untrusted", then the APLS 300 maintains the selected AP's location status as "unknown", and discards the calculated location provided by the mobile device 110. For some embodiments, the APLS 300 may not assign a quality value of "primary" to a set of measurements until they can be verified by another source (e.g., another mobile device).

Note that while the quality value indicates a level of consistency for the set of location measurements provided by mobile device 110, the location status value indicates how confident the APLS 300 is about the selected AP's location. Therefore, the location status of the selected AP does not necessarily indicate the quality level of location measurements for the selected AP provided by mobile device 110. For example, an AP having a location status of "ambiguous" could nevertheless have stored location information (e.g., in the location database 310) of a "primary" quality.

Further, note that mobile device 110 may be able to determine its own location (e.g., using its GNSS module 210) without using an associated WLAN positioning system. If so, then the location measurements provided by mobile device 110 (as well as the location coordinates of mobile device 110) may be sent to the APLS 300 to determine the selected AP's location and/or to update corresponding AP location information stored in the location database 310.

Referring again to FIG. 4A, if the APLS 300 already stores location data for the selected AP, as tested at 406, then the APLS 300 retrieves the location data from the corresponding location entry 320 in the location database 310 and determines the location status of the selected AP (414). If the selected AP has a trusted location status, as tested at 416, then the APLS 300 calculates the location of the selected AP using the set of location measurements provided by mobile device 110 (418), and compares the newly calculated AP location with the corresponding AP location data already stored in the location database 310 to generate a difference value (420).

If the difference value (DIFF) is less than or equal to the distance threshold $D_{TH}$, as tested at 422, the APLS 300 maintains the selected AP's location status as "trusted," and then updates (e.g., refines) the stored location data with the calculated location (424). For some embodiments, the set of location measurements provided by the mobile device 110 are stored as a new location entry 320 having a "primary" quality value, and the APLS 300 may supplement the location data already stored in the location database 310 using the new location entry. For such embodiments, before the APLS 300 sends location data for the selected AP in response to a subsequent location request (e.g., from a mobile device seeking the location of the selected AP), the APLS 300 automatically fetches all the AP's location entries that have a quality value set to "primary," calculates an average of these locations, and then reports the average location to the requesting device. For other embodiments, the set of location measurements are combined (e.g., averaged) with the existing location data stored in the location database 310. For these other embodiments, the APLS 300 may count the number of sets of location measurements that have been used to update the selected AP's location data stored in location database 310, wherein a higher count value indicates a higher quality value of the stored location data.

Conversely, if the difference value is greater than the predetermined threshold $D_{TH}$, as tested at 422, then the APLS 300 performs the area recognition operation to determine whether the selected AP has been moved or if the set of location measurements provided by the mobile device 110 is unreliable (e.g., resulting from an erroneous measurement or a spoofing attempt) (426). More specifically, referring now to FIG. 4C, if the APLS 300 determines that the set of location measurements provided by the mobile device 110 is trustworthy (thereby indicating that the selected AP has been moved), as tested at 428, then the APLS 300 updates the selected AP's location data using the set of location measurements provided by the mobile device 110 (430). Conversely, if the APLS 300 determines that the set of location measurements provided by the mobile device 110 is not trustworthy (thereby indicating errors in the set of location measurements), as tested at 428, then the APLS 300 ignores the set of measurements provided by the mobile device 110, and does not update the selected AP's location data stored in the location database 310 (432).

For some embodiments, the APLS 300 may determine whether the set of location measurements provided by the mobile device 110 is trustworthy by performing a consistency analysis of the set of location measurements received from the mobile device 110, deriving a trustworthiness value indicating a trustworthiness of the set of location measurements provided by the mobile device 110, and then comparing the trustworthiness value with a predetermined trustworthiness threshold. For example, the trustworthiness value may be derived according to how many of the calculated locations for other APs provided by mobile device 110 are consistent with corresponding AP location data already stored in the APLS 130, where a higher trustworthiness value indicates that a larger number or percentage of the calculated locations for the other APs are consistent with the corresponding AP location data already stored in location database 310, and a lower trustworthiness value indicates that a smaller number or percentage of the calculated locations for the other APs are consistent with the corresponding AP location data already stored in location database 310.

As mentioned above, the trustworthiness value can be any suitable scale, state machine, and/or number system that indicates different levels of trustworthiness for location measurements provided by the mobile device 110. For example, in an exemplary embodiment, a trustworthiness scale of 1 to 10 may be used, where a trustworthy value of 10 is the most trustworthy and a trustworthy value of 1 is the least trustworthy. For exemplary embodiments discussed herein, the trustworthiness threshold may be set to 7, and thereafter only AP locations calculated by mobile device 110 having a trustworthiness value greater than or equal to 7 are accepted and used to update the AP location information stored in the APLS 130. In this manner, if the sets of location measurements provided by mobile device 110 are not sufficiently consistent to be deemed as "trustworthy" (e.g., where the trustworthiness value <7), as tested at 428, then the APLS 300 does not update the "primary" quality location data with the set of location measurements provided by mobile device 110 (432).

For some embodiments, if the location measurements are not deemed to be "trustworthy," as tested at 428, the APLS 300 may also assign the set of location measurements provided by mobile device 110 with a quality value that is one level lower than the "primary" level (e.g., "auxiliary_1"), and then store the set of location measurements, along with its corresponding calculated location, the selected AP's MAC address, and the assigned quality value as a new location entry 320 in the location database 310. Further, for some embodiments, the APLS 300 may also degrade the quality values of all other entries having an "auxiliary" quality status to a lower level or value, thereby lowering the quality level of the AP's location data stored in the location database 310. For example, a location entry previously assigned a quality value of "auxiliary_1" may be reassigned to a quality value of "auxiliary_2," a location entry previously assigned a quality value of "auxiliary_2" may be reassigned to a quality value of "auxiliary_3," and so on.

Conversely, if the location measurements provided by mobile device 110 are sufficiently consistent to be deemed as "trustworthy" (e.g., where the trustworthiness value ≥7), as tested at 428, then the APLS 300 updates the location data stored in the location database 310 using the set of location measurements provided by the mobile device 110. In addition, for some embodiments, the APLS 300 may continue monitoring how many sets of location measurements provided by the mobile device 110 are assigned to the "primary" quality level. For example, if the current "primary" location data for the selected AP is based upon only one set of location measurements provided by mobile device 110, which usually occurs when a new AP location entry 320 is entered into the location database 310 and/or when an AP's location status has recently changed from "unknown" or "ambiguous" to "trusted," then the APLS 300 has less confidence in the current "primary" location data than if the location data is based upon a multitude of different sets of location measurements. Therefore, according to the present embodiments, if the current "primary" quality location data for the selected AP is based upon only one set of location measurements, then the APLS 300 may assign a quality value that is one level lower than the "primary" quality level (e.g., "auxiliary_1").

In contrast, if the APLS 300 has cross-referenced the stored AP location data with other sources, then the APLS 300 has more confidence in the current "primary" quality location data stored in the location database 310. Thus, if the current "primary" quality location data for the selected AP is based upon a plurality of sets of location measurements, then the APLS 300 may determine whether mobile device 110 has provided location measurements for other APs and/or may determine whether any of these other APs has a "trusted" location status. If the current "primary" quality location data for the selected AP is not based upon a plurality of sets of location measurements, or if mobile device 110 has not provided location measurements for other APs, which indicates that area recognition is not possible, then the APLS 300 assigns the set of location measurements with a quality value that is one level lower than the "primary" level (e.g., "auxiliary_1"), and stores the set of location measurements, along with the corresponding calculated location, the corresponding AP's MAC address, and the assigned quality value as a new location entry 320 in the location database 310. In addition, the APLS 300 may also degrade the quality values of all other entries having an "auxiliary" quality value by one level.

Figure 5:
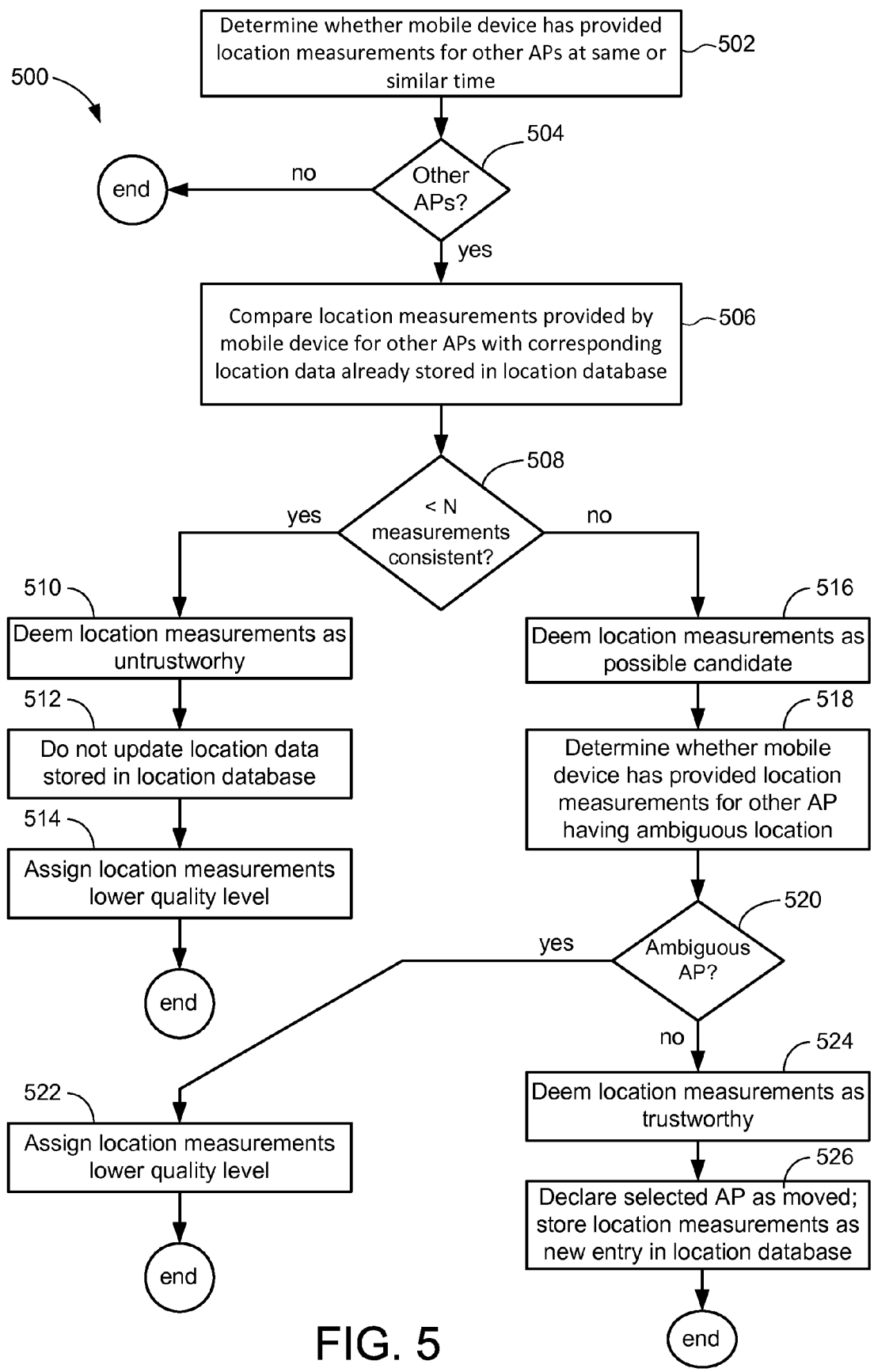
FIG. 5 shows an illustrative flow chart depicting an exemplary area recognition operation for selectively updating AP location information stored in the APLS of FIG. 3.

Conversely, if the current "primary" quality location data for the selected AP is based upon a plurality of sets of location measurements and if mobile device 110 has provided location measurements for other APs, which indicates that area recognition is possible, then the APLS 300 performs area recognition operations in the manner described above (e.g., to determine a trustworthiness value for the location data). More specifically, referring now to the illustrative flow chart 500 of FIG. 5, for some embodiments, the APLS 300 first determines whether the mobile device 110 has provided location measurements for other APs at the same or similar time as it provided the location measurements for the selected AP (502). If so, as tested at 504, then the APLS 300 compares the calculated locations of the other APs with their corresponding locations previously stored in the location database 310 (506). Thereafter, if less than a predetermined number or percentage of the calculated locations for the other APs are consistent with their corresponding previously stored locations, as tested at 508, then the set of location measurements provided by mobile device 110 for the selected AP are deemed to be untrustworthy (510). In response thereto, the APLS 300 does not update the AP location data stored in location database 310 (512), and the APLS 300 may assign the set of location measurements with a quality value that is one level lower than the "primary" quality level (e.g., "auxiliary_1") (514).

On the contrary, if the number of calculated locations for the other APs that are consistent with their corresponding previously stored locations is equal to or greater than the predetermined number, then the APLS 300 may deem the newly calculated location for the selected AP as a possible candidate for storage in the location database 310 (516). Thereafter, the APLS 300 determines whether mobile device 110 has provided any location information having an "ambiguous" location status for other APs at the same or similar time as it provided the set of location measurements for the selected AP (518). If so, as tested at 520, then the APLS 300 may assign the set of location measurements with a quality value that is one level lower than the "primary" quality level (e.g., "auxiliary_1"), and stores the set of location measurements, along with its corresponding calculated location, the corresponding AP's MAC address, and the assigned quality value as a new location entry in the location database 310 (522).

However, if mobile device 110 has not provided any location information having an "ambiguous" location status for other APs at the same or similar time as the set of location measurements for the selected AP are taken, as tested at 520, then the APLS 300 may treat the set of location measurements as trustworthy (524). Then, the APLS 300 may declare that the selected AP has been moved, delete the old "primary" location entry (or entries) 320 for the selected AP in the location database 310, and thereafter create a new "primary" quality location entry 320 using the newly calculated location for the selected AP (526). Further, the APLS 300 may also change the selected AP's location status to "trusted." In this manner, the APLS 300 can automatically update the location database 310 while maintaining the accuracy of location data stored therein.

Referring again to FIGS. 4A and 4B, if the selected AP does not have a "trusted" location status, as tested at 416, then the APLS 300 calculates the location of the selected AP using the set of location measurements provided by mobile device 110 (434). Next, the APLS 300 compares the calculated AP location with the stored AP location data entry 320 having the highest quality value (e.g., the "primary" quality location entry) to determine a difference value (436). Note that because the location status of the selected AP is not set to "trusted," the selected AP may not have any "primary" quality location data stored in the location database 310.

If the difference value is less than or equal to the predetermined distance threshold $D_{TH}$, as tested at 438, the stored location data for the selected AP is confirmed, and the APLS 300 may also store the set of location measurements provided by mobile device 110, along with the calculated location for the selected AP, as a new location entry 320 in the location database 310 (440). The APLS 300 may also assign the new location entry the same quality value as the previously stored location entry for the selected AP (442). The set of location measurements provided by mobile device 110 may also be used to refine the original AP location data stored in the location database 310. In addition, the APLS 300 may also change the selected AP's location status to "trusted," and delete any original location entries having quality values less than the new entry.

Conversely, if the difference value is greater than the predetermined distance threshold $D_{TH}$, as tested at 438, then the APLS 300 sequentially compares the calculated AP location with stored AP location entries 320 of decreasing quality levels (e.g., "auxiliary_1" location entries, then "auxiliary_2" location entries, and so on) to generate subsequent difference values (444). If any of the lower-quality location entries 320 is within the predetermined distance $D_{TH}$ of the calculated AP location, as tested at 446, then that location entry may be deemed to be "trustworthy," the APLS 300 may declare the selected AP as having been moved (448), and may update the location database 310 by creating a new "primary" location entry 320 using the calculated AP location (450). For some embodiments, the APLS 300 may delete any previously stored location entries for the selected AP.

If none of the location entries 320 for the selected AP is within the predetermined distance $D_{TH}$ of the calculated AP location, as tested at 446, then the APLS 300 performs an area recognition operation on the set of location measurements provided by the mobile device 110 to determine its trustworthiness (452). For some embodiments, the APLS 300 performs a consistency analysis of the set of location measurements provided by the mobile device 110 and assigns a trustworthy value thereto. Then, if the set of location measurements are not found to be consistent (e.g., consistency value <7), then the APLS 300 does not update the "primary" location entry (i.e., the location entry assigned to the highest quality value) with the set of location measurements, but assigns to the set of location measurements a quality value that is one level lower than the "primary" level (e.g., "auxiliary_1"). The APLS 300 may then store the set of location measurements, along with its corresponding calculated location, the corresponding AP's MAC address, and the assigned quality value as a new location entry 320 in the location database 310. The APLS 300 may also degrade the quality values of all other location entries having an "auxiliary" quality level by one level.

On the contrary, if the set of location measurements are found to be consistent (e.g., consistency value ≥7), then the APLS 300 determines whether the selected AP is the only AP indicated by mobile device 110 as having been moved. If the selected AP is not the only AP that mobile device 110 indicates as having been moved, then it is still possible that mobile device 110's measurements are erroneous (e.g., from a spoofing attempt). Thus, in response thereto, the APLS 300 assigns the set of location measurements with a quality value that is one level lower than the "primary" level (e.g., "auxiliary_1"), and stores the set of location measurements, along with its corresponding calculated location, the corresponding AP's MAC address, and the assigned quality value as a new location entry 320 in the location database 310. The APLS 300 may also degrade the quality values of all other location entries having an "auxiliary" quality level by one level.

However, according to the present embodiments, if one or more location entries have been downgraded to minimum threshold quality value (e.g., "auxiliary_3") and the selected AP's location status is not "trusted," then all location entries for the selected AP are deleted from the location database 310 (e.g., because the stored location data for the selected AP remains to uncertain).

If the selected AP is the only AP that mobile device 110 indicates as having been moved, then the APLS 300 determines whether mobile device 110 has provided location measurements for other APs that have a "trusted" location status. If not, which indicates that an area recognition operation is not possible, then the APLS 300 may assign the set of location measurements with a quality value that is one level lower than the "primary" level (e.g., "auxiliary_1"), and may store the set of location measurements, along with its corresponding calculated location, the corresponding AP's MAC address, and the assigned quality value as a new location entry 320 in the location database 310. The APLS 300 may also degrade the quality values of all other location entries having with an "auxiliary" quality status by one level. However, if one or more entries have already reached the minimum threshold quality value (e.g., "auxiliary_3") and the respective AP's location status is still "ambiguous," then all entries for the selected AP may be deleted from the location database 310. If so, which indicates that the area recognition operation is possible, then the APLS 300 performs the area recognition operation.

More specifically, the APLS 300 looks for calculated locations provided by mobile device 110 for other APs at the same or similar time it provided the location measurements for the selected AP, and compares these calculated locations for the other APs with their corresponding location data already stored in the location database 310. If less than the predetermined number or percentage of the calculated locations for the other APs are consistent, then the set of location measurements provided by mobile device 110 for the selected AP is deemed to be untrustworthy, the APLS 300 does not update the location database 310. Thereafter, the APLS 300 may assign to the set of location measurements a quality value that is one level lower than the "primary" level (e.g., "auxiliary_1"), and may store the set of location measurements, along with its corresponding calculated location, the corresponding AP's MAC address, and the assigned quality value as a new location entry 320 in the location database 310. The APLS 300 may also degrade the quality values of all other entries having an "auxiliary" quality status by one level.

Conversely, if more than the predetermined number or percentage of calculated locations for the other APs are consistent with the corresponding previously known locations, then the newly calculated location for the AP may be deemed to be trustworthy. In response thereto, the APLS 300 may declare that the respective AP has been relocated, and may update the location database 310 by creating a new "primary" location entry using the newly calculated location. In addition, the APLS 300 may change the selected AP's location status to "trusted," and delete any original location entries stored in the location database.

Figure 6A:
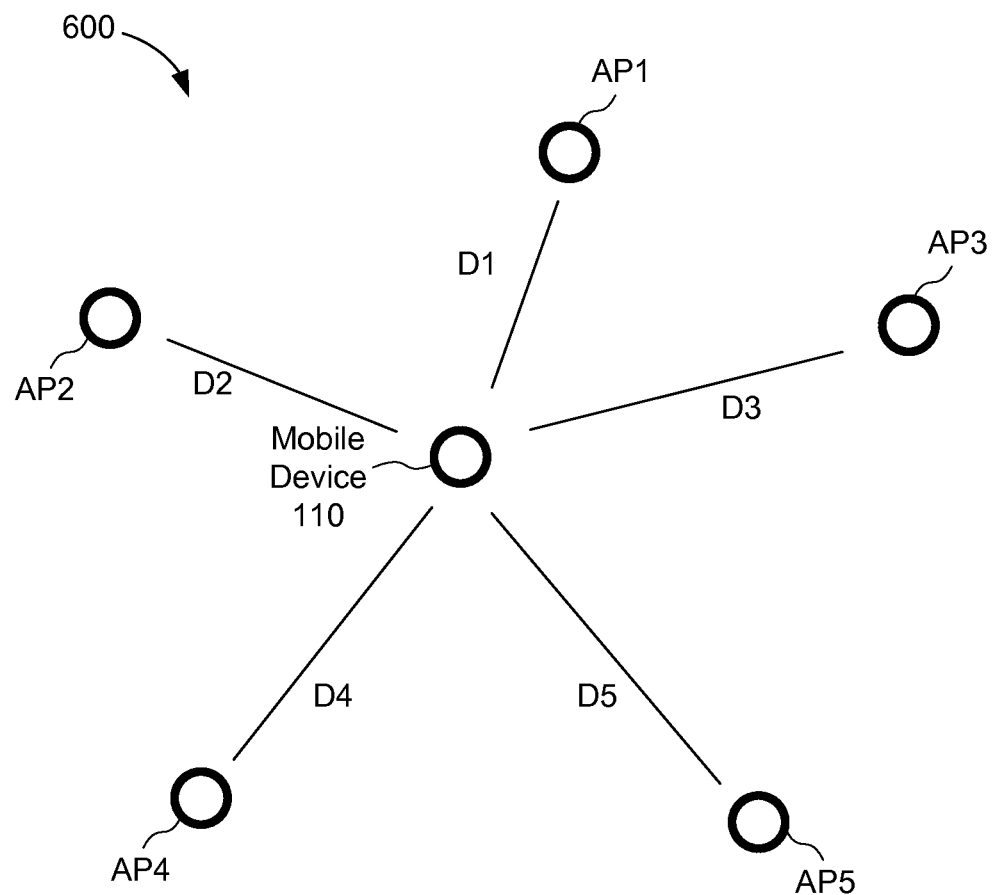
FIG. 6A is an exemplary diagram of a WLAN depicting a mobile device communicating with an access point location server to determine the mobile device's location, in accordance with some embodiments.
Figure 6B:
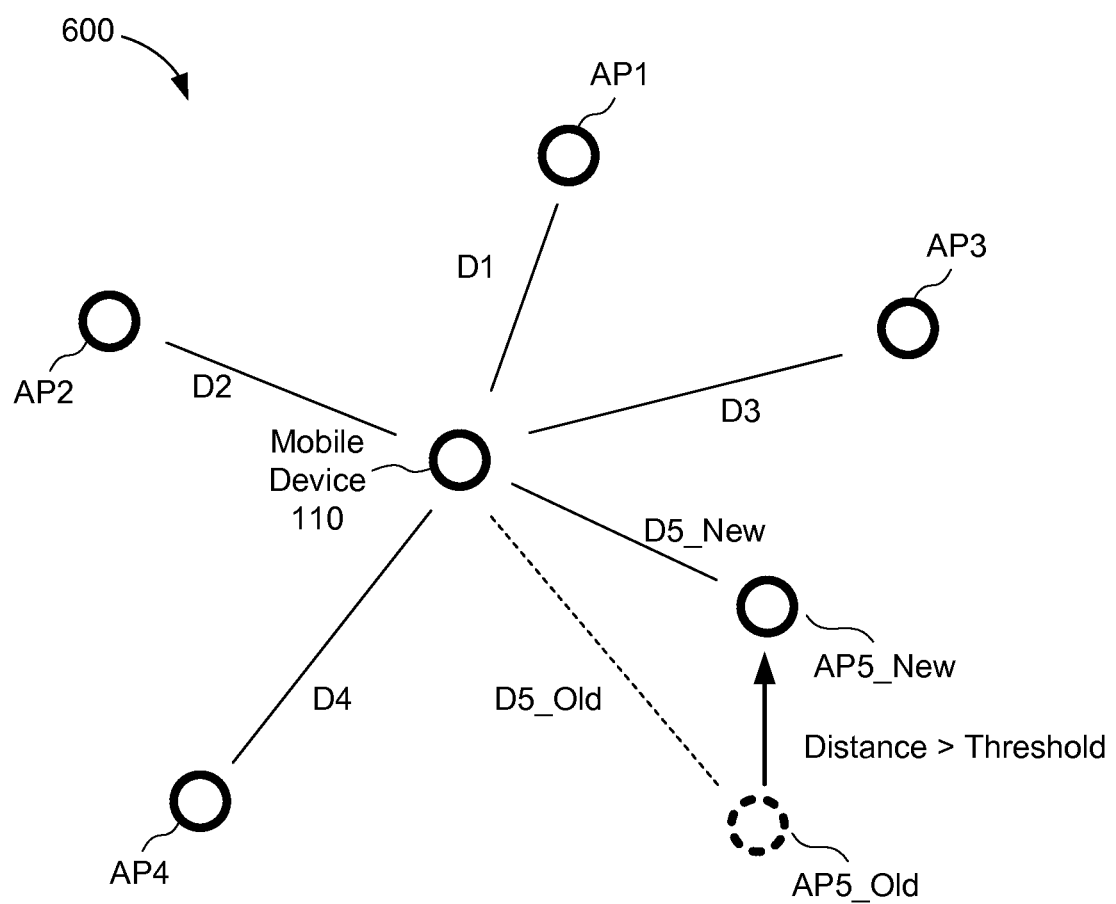
FIG. 6B is an exemplary diagram of a WLAN depicting a mobile device communicating with an access point location server with one access point moved to a new location, in accordance with some embodiments.

FIGS. 6A-6B are exemplary diagrams of a WLAN depicting a mobile device communicating with an APLS to determine the mobile device's location, in accordance with some embodiments. FIG. 6A shows a WLAN 600 formed by five access points AP1-AP5 and in communication with mobile device 110. As described above, mobile device 110 may obtain the MAC addresses of AP1-AP5, and estimate the distances between itself and each of AP1-AP5 (e.g., using RF ranging operations that employ RSSI and/or RTT techniques). Then, mobile device 110 may send the resulting sets of location measurements (e.g., distances D1-D5 between mobile device 110 and AP1-AP5, respectively) to the APLS 300 (not shown in FIG. 6A for simplicity).

FIG. 6B shows the WLAN 600 of FIG. 6A at a second time at which AP5 has been moved to a new location (from AP5_Old to AP5_New). When the APLS 300 receives from mobile device 110 a set of location measurements (D5_New) for AP5 indicating that AP5 has been relocated, the APLS 300 first determines whether AP5's location data is stored in its location database 310. If not, then the APLS 300 determines the quality level of the set of location measurements (D5_New) for AP5 in the manner described above with respect to FIG. 4A, and then selectively stores the set of location measurements (D5_New) as a new location entry 320 in location database 310.

Figure 4B:
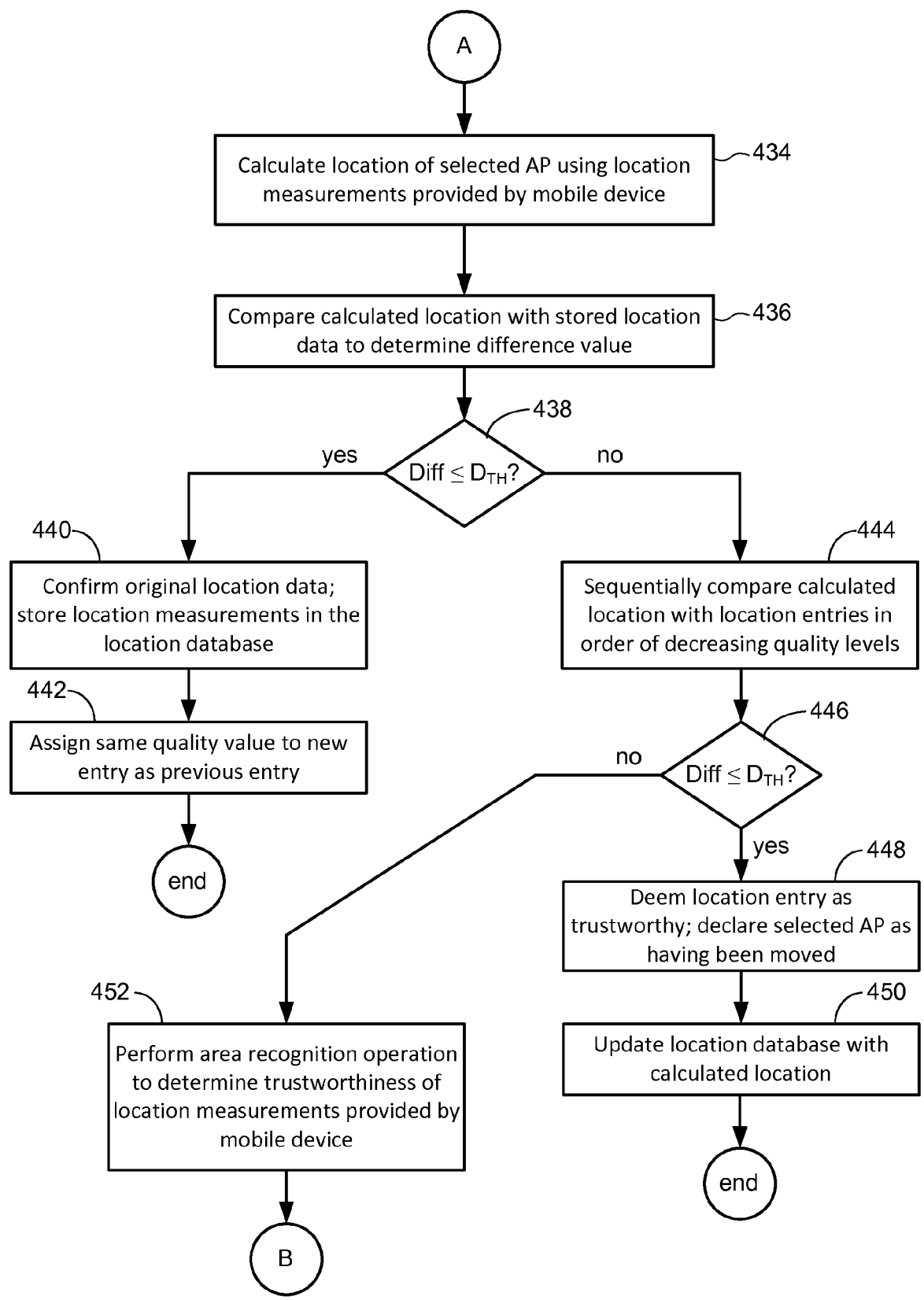
Figure 4C:
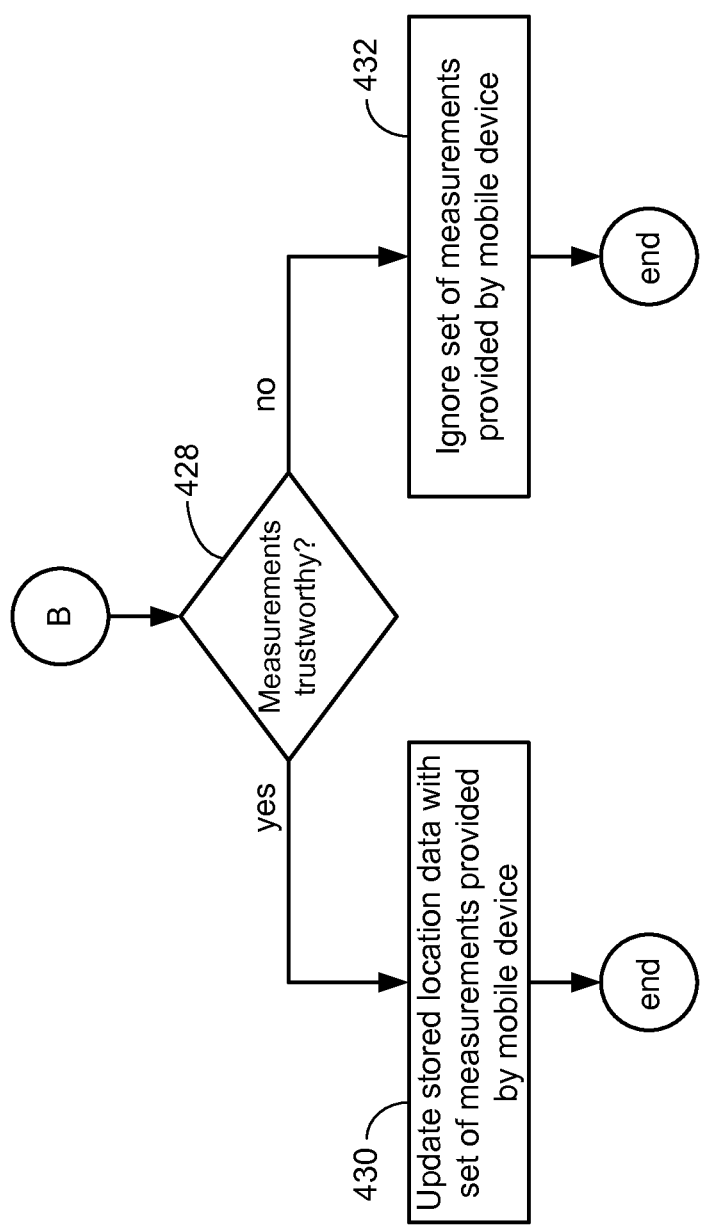

Referring also to FIGS. 4A-4C, if location data for AP5 is already stored in the location database 310, then the APLS 300 determines whether AP5 has a "trusted" location status, as tested at 416. If not, then the APLS 300 proceeds to 428 to determine whether the set of location measurements are trustworthy. Conversely, if AP5 has a trusted location status, then the APLS 300 proceeds to 418 and compares the calculated location of AP5 with the stored location of AP5 to determine whether the calculated location is consistent with the stored location (422). If the calculated location is consistent with the stored location, then the location database is updated with the set of location measurements provided by mobile device 110. If the calculated location is not consistent with the stored location, then the APLS 300 performs area recognition operations to determine the trustworthiness of mobile device 110's location measurements. If the location measurements for other APs are found to be consistent with corresponding stored AP location data in the location database 310, then the APLS 300 updates the location data of AP5 using the location measurements (D5_New) provided by mobile device 110.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of maintaining data accuracy in a Wi-Fi access point location database including a plurality of location entries each for storing location data for a corresponding one of a plurality of access points, the method comprising:
receiving a first set of location measurements for a selected access point from a first mobile device;
determining a trustworthiness value of the first set of location measurements in response to a first comparison between the first set of location measurements and the location data for the selected access point stored in the location database;
if the trustworthiness value is greater than a trustworthiness threshold, then updating the stored location data for the selected access point in the location database using the first set of location measurements; and
if the trustworthiness value is not greater than the trustworthiness threshold, then:
receiving additional sets of location measurements for one or more other access points from the first mobile device;
performing an area recognition operation for at least some of the additional sets of location measurements provided by the first mobile device during a predetermined time period by comparing the additional sets of location measurements and the location data for the one or more other access points stored in the location database to generate a consistency value; and
updating the stored location data for the selected access point in the location database using the first set of location measurements if the consistency value is greater than a consistency threshold.

2. The method of claim 1, further comprising:
calculating the location of the selected access point in response to the first set of location measurements provided by the first mobile device; and
averaging the calculated location with the stored location data for the selected access point to generate an averaged location for the selected access point.

3. The method of claim 1, further comprising:
receiving a second set of location measurements for the selected access point from a second mobile device, wherein the trustworthiness value is further determined in response to a second comparison between the first and second sets of location measurements.

4. The method of claim 1, further comprising:
receiving a third set of location measurements for a second access point from the first mobile device, wherein the trustworthiness value is further determined in response to a third comparison between the third set of location measurements and the location data for the second access point stored in the location database.

5. The method of claim 1, wherein the consistency value indicates a percentage of the additional sets of location measurements determined to be consistent with the stored location data for the corresponding one or more other access points.

6. The method of claim 1, further comprising:
receiving a second set of location measurements for the selected access point from a second mobile device; and
determining a consistency value between the first and second sets of location measurements for the selected access point.

7. The method of claim 6, wherein the stored location data for the selected access point is updated only if the consistency value is greater than or equal to a consistency threshold.

8. The method of claim 1, wherein determining the trustworthiness value comprises:
comparing the first set of location measurements with each other to determine whether an inconsistent measurement exists in the first set of location measurements for the selected access point; and
selectively ignoring the first set of location measurements in response to the existence of the inconsistent measurement.

9. A system of maintaining data accuracy in a Wi-Fi access point location database including a plurality of location entries each for storing location data for a corresponding one of a plurality of access points, the system comprising:
means for receiving a first set of location measurements for a selected access point from a first mobile device;
means for determining a trustworthiness value of the first set of location measurements in response to a first comparison between the first set of location measurements and the location data for the selected access point stored in the location database;

means for updating the stored location data for the selected access point in the location database using the first set of location measurements if the trustworthiness value is greater than a trustworthiness threshold;

means for selectively updating the stored location data for the selected access point in the location database using the first set of location measurements if the trustworthiness value is not greater than a trustworthiness threshold, wherein the means for selectively updating comprises:

means for receiving additional sets of location measurements for one or more other access points from the first mobile device;

means for performing an area recognition operation for at least some of the additional sets of location measurements provided by the first mobile device during a predetermined time period by comparing the additional sets of location measurements and the location data for the one or more other access points stored in the location database to generate a consistency value; and means for updating the stored location data for the selected access point in the location database using the first set of location measurements if the consistency value is greater than a consistency threshold.

10. The system of claim 8, further comprising:
means for calculating the location of the selected access point in response to the first set of location measurements provided by the first mobile device; and
means for averaging the calculated location with the stored location data for the selected access point to generate an averaged location for the selected access point.

11. The system of claim 9, further comprising:
means for receiving a second set of location measurements for the selected access point from a second mobile device, wherein the trustworthiness value is further determined in response to a second comparison between the first and second sets of location measurements.

12. The system of claim 9, further comprising:
means for receiving a third set of location measurements for a second access point from the first mobile device, wherein the trustworthiness value is further determined in response to a third comparison between the third set of location measurements and the location data for the second access point stored in the location database.

13. The system of claim 9, wherein the consistency value indicates a percentage of the additional sets of location measurements determined to be consistent with the stored location data for the corresponding one or more other access points.

14. The system of claim 9, further comprising:
means for receiving a second set of location measurements for the selected access point from a second mobile device; and
means for determining a consistency value between the first and second sets of location measurements for the selected access point.

15. The system of claim 14, wherein the stored location data for the selected access point is updated only if the consistency value is greater than or equal to a consistency threshold.

16. The system of claim 9, wherein determining the trustworthiness value comprises:
means for comparing the first set of location measurements with each other to determine whether an inconsistent measurement exists in the first set of location measurements for the selected access point; and
means for selectively ignoring the first set of location measurements in response to the existence of the inconsistent measurement.

17. An access point location server, comprising:
a database including a plurality of location entries each for storing location data for a corresponding one of a plurality of access points; and
a processor to:
receive a first set of location measurements for a selected access point from a first mobile device;
determine a trustworthiness value of the first set of location measurements in response to a first comparison between the first set of location measurements and the location data for the selected access point stored in the location database;
if the trustworthiness value is greater than a trustworthiness threshold, then update the stored location data for the selected access point in the location database using the first set of location measurements; and
if the trustworthiness value is not greater than the trustworthiness threshold, then
perform an area recognition operation for at least some of the additional sets of location measurements provided by the first mobile device during a predetermined time period by comparing the additional sets of location measurements and the location data for the one or more other access points stored in the location database to generate a consistency value; and
update the stored location data for the selected access point in the location database using the first set of location measurements if the consistency value is greater than a consistency threshold.

18. The access point location server of claim 17, wherein the processor is to further:
calculate the location of the selected access point in response to the first set of location measurements provided by the first mobile device; and
average the calculated location with the stored location data for the selected access point to generate an averaged location for the selected access point.

19. The access point location server of claim 17, wherein the processor is to further:
receive a second set of location measurements for the selected access point from a second mobile device, wherein the trustworthiness value is further determined in response to a second comparison between the first and second sets of location measurements.

20. The access point location server of claim 17, wherein the processor is to further:
receive a third set of location measurements for a second access point from the first mobile device, wherein the trustworthiness value is further determined in response to a third comparison between the third set of location measurements and the location data for the second access point stored in the location database.

21. The access point location server of claim 17, wherein the consistency value indicates a percentage of the additional sets of location measurements determined to be consistent with the stored location data for the corresponding one or more other access points.

22. The access point location server of claim 17, wherein the processor is to further:
  receive a second set of location measurements for the selected access point from a second mobile device; and
  determine a consistency value between the first and second sets of location measurements for the selected access point.

23. The access point location server of claim 22, wherein the stored location data for the selected access point is updated only if the consistency value is greater than or equal to a consistency threshold.

24. The access point location server of claim 17, wherein the processor is to determine the trustworthiness value by:
  comparing the first set of location measurements with each other to determine whether an inconsistent measurement exists in the first set of location measurements for the selected access point; and
  selectively ignoring the first set of location measurements in response to the existence of the inconsistent measurement.

* * * * *